Inventors
MAYO A. GOODBAR &
ALBERT J. GREEN

BY Carl Berst

THEIR Attorney

Feb. 28, 1950

M. A. GOODBAR ET AL

2,499,217

DRAWER CONTROLLED PRINTING AND FEEDING
MEANS IN CASH REGISTERS

Filed Feb. 15, 1947

Inventors
MAYO A. GOODBAR &
ALBERT J. GREEN

BY Earl Beust

THEIR Attorney

Patented Feb. 28, 1950

2,499,217

UNITED STATES PATENT OFFICE 2,499,217

DRAWER CONTROLLED PRINTING AND FEEDING MEANS IN CASH REGISTERS

Mayo A. Goodbar and Albert J. Green, Dayton, Ohio, assignors to The National Cash Register Company, Dayton, Ohio, a corporation of Maryland Application February 15, 1947, Serial No. 728,780

13 Claims. (Cl. 101—288)

The present invention is directed to cash registers and/or accounting machines and relates in particular to the record material printing and feeding mechanisms of such machines.

The ever-expanding use of cash registers and/or accounting machines in the business world has created a demand for a moderately-priced machine having an improved record material mechanism which is efficient in design and simple in construction, and one which has the capacity for storing a maximum supply of record material in a minimum space. It is also desirable that the improved record material mechanism and its supply of record material be contained as a compact unit in a suitable receptacle or magazine which may be moved from a closed or working position to an open or more accessible position for the replenishing of the supply of record material, and which receptacle may be readily removed from the machine for the adjustment or repair of said mechanism in case these latter are necessary or desirable.

With the above in mind, the general object of this invention is the provision of an improved record material mechanism for use in connection wtih cash registers and/or accounting machines.

Another object is to provide cash registers and accounting machines with an improved mechanism for producing and issuing a printed record.

Another object is the provision of an improved record material mechanism which permits the storage of a comparatively large supply of record material in a minimum of space.

Another object of this invention is the provision of a record material mechanism which is contained as a compact unit in a drawer-like receptacle which is movable from working or operating position to a more accessible position for the insertion of a new supply of record material, and for the adjustment and/or repair of said mechanism.

A further object is to provide accounting machines and cash registers with an improved record material mechanism which is contained as a compact unit in a receptacle which may be moved from working or operating position to a more convenient position, or, if desired, removed entirely from the machine for the replenishing of the supply of record material, and/or for the purpose of adjustment or repair of said mechanism.

A still further object of the present invention is to provide controlling mechanism between the record material mechanism and the other important mechanisms of the machine to enforce proper operation of said machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

DESCRIPTION

The present invention is directed to an improved receipt printing and issuing or feeding mechanism for cash registers and/or accounting machines, which improved mechanism is contained as a compact unit in a box-shaped drawer which also forms a receptacle or magazine for the supply of receipt material, which in this case is a package of fanfolded receipt paper. The printer drawer is movable from closed or operating position outwardly to open or a more accessible position for the adjustment of the mechanism contained therein, for the insertion of a new supply package of receipt material, and for the convenient threading of the web of the receipt material over the printing and feeding mechanism. If desirable or necessary, the printer drawer may be readily removed from the machine by moving said drawer inwardly a slight distance from fully open position and lifting up on said drawer, and then withdrawing it outwardly until free of the machine. The front end of the printer drawer forms a hinged door or closure which is normally latched in closed position, but, when said drawer is open, the door may be unlatched and opened to give access to the interior of the drawer for the insertion of a new supply package of receipt material. When the drawer is closed, the door giving access to the interior thereof cannot be opened.

The printer drawer contains two impression hammers, one of which coacts with the type wheels and the other of which coacts with an electro for printing desired data on the face of the receipt. Likewise, the printer drawer supports the mechanism for feeding the receipt material and the mechanism for advancing the consecutive number type wheels, which along with the other type wheels are supported in the main portion of the machine, as also are the inking ribbon and its feeding mechanism for the inking of said type wheels and said electro.

Figures 2, 19, 20:
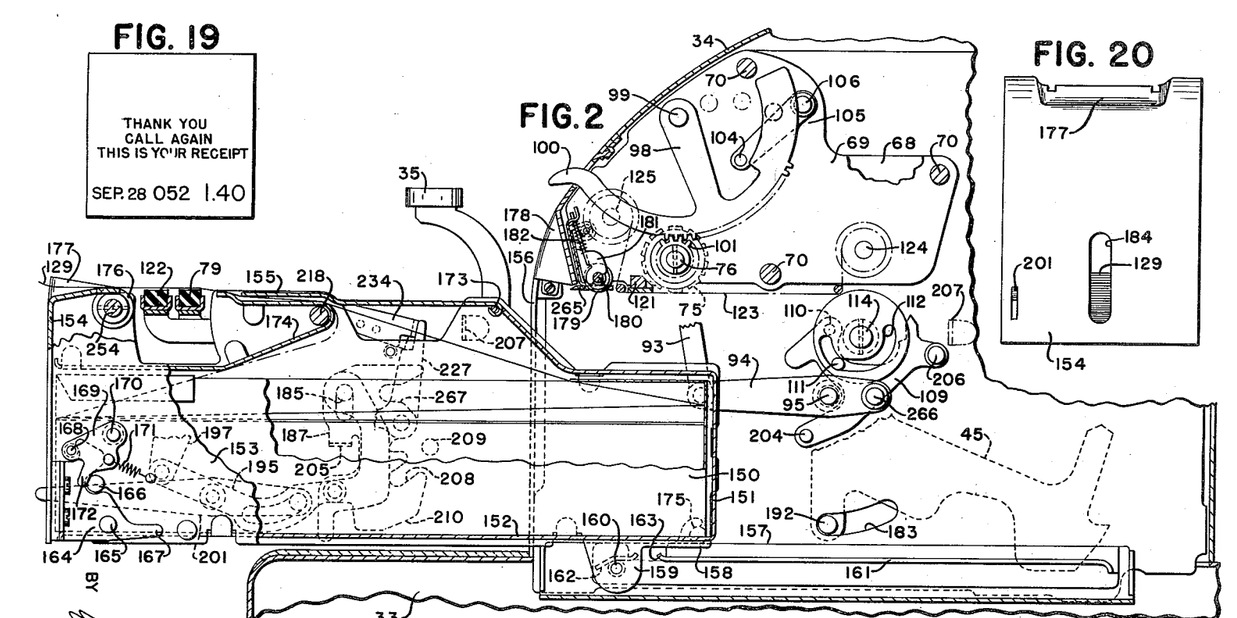
Fig. 2 is a right side elevation, partially sectioned, showing in particular the movable printing unit in its forward position for the convenient replenishing of the record material supply.
Fig. 19 is a facsimile of a receipt produced by the machine of this invention.
Fig. 20 is a front view of the drawer or magazine for housing the supply of receipt material.

The simplicity and accessibility of the improved receipt printing mechanism make it a comparatively simple matter to install new receipt material in the machine. With the drawer in open position, as shown in Fig. 2, the door giving access to the interior of said drawer is opened, and the pack of fanfolded receipt material is inserted within said drawer. The door is then closed, and another door on the top surface of the printer drawer provides another convenient opening to the interior of the drawer through which the operator may pick up the web of the fanfolded receipt material and carry said web forwardly across the printing hammers and the feeding rollers, thence through a guide chute formed by the upper portion of the printer drawer. After this, it is only necessary to close the printer drawer to condition the machine and the receipt mechanism for operation. The driving or operating mechanism for the impression hammers, for the receipt feeding mechanism, and for the consecutive number type wheels is contained in the machine proper, and, when the printer drawer is in open position, the mechanisms contained therein are disconnected from their driving or operating mechanism. However, closing the drawer connects the operating mechanism to the mechanisms contained in the drawer, thus conditioning the machine for operation.

The present machine is provided with the usual type of manually positionable control lever for controlling the various functions of the machine, and controlling mechanism is provided which makes it impossible to move the printer drawer to closed or operating position unless the control lever is in either Read or Reset position. This same controlling mechanism makes it impossible to move the printer drawer out of closed position unless the control lever is in either Read or Reset position.

A conveniently located On and Off lever is provided for controlling the issuing of a receipt, and, when the machine control lever, referred to above, is in either Read or Reset position, said On and Off lever may be moved to Off position to render the receipt printing and feeding mechanisms inoperative. It is likewise necessary to move the On and Off lever to Off position before the printer drawer may be opened or removed from the machine.

The machine chosen to illustrate the present invention is a press-down-key type of cash register of comparatively simple construction. However, it is not the desire nor the intention to confine applicants' improved mechanism to any particular type of machine, as with minor adjustments and alterations it may be adapted for use in practically any type of cash register and/or accounting machine.

Framework

The framework of the machine comprises a left side plate 30 (Figs. 1 and 2) and a right side plate 31 maintained in parallel and vertical relationship to each other by front tie bars (not shown), by a back frame 32, and by various shafts and rods which extend between said side plates 30 and 31. The machine framework, comprising the two side plates 30 and 31, the back frame 32, and the various tie bars and rods, is secured to the top surface of a drawer cabinet 33 (Fig. 2), and the mechanism of the machine is enclosed by a suitable cabinet 34, which is in turn secured to the machine framework.

Key mechanism in general

The present machine is provided with a plurality of amount keys 35 (Figs. 1 and 2) of the so-called "five-cent key arrangement," including keys arranged in multiples of five, from five cents to ninety cents, and one-, two-, and three-dollar keys. The keys of the present machine also include a Paid-out transaction key 36, a No-sale transaction key 36, and two department or clerks keys 37, which latter control the selection of the two totalizers with which the present machine is equipped. The keys are rockably supported on a shaft 38 journaled in the plates 30 and 31.

In the present arrangement, the amount keys comprise three denominational orders, each of which controls corresponding differential mechanisms for positioning corresponding type wheels and indicators and for entering the representative values thereof into the corresponding totalizer wheels. Likewise the transaction keys 36 and the department keys 37 control corresponding differential mechanisms which in turn position corresponding type wheels and indicators.

Key coupler mechanism

Figure 1:
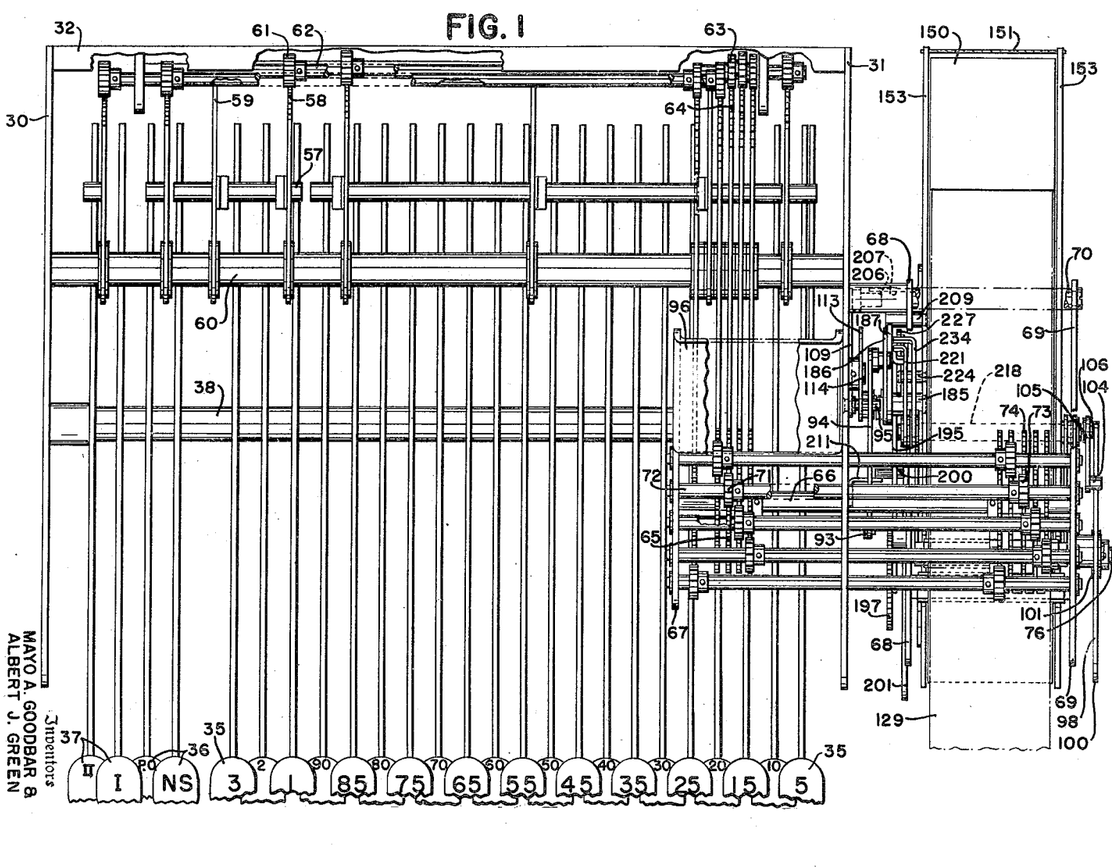
Fig. 1 is a plan view of a portion of the machine, showing in particular the key arrangement and the receipt printing mechanism.
Figures 3, 4, 5, 6:
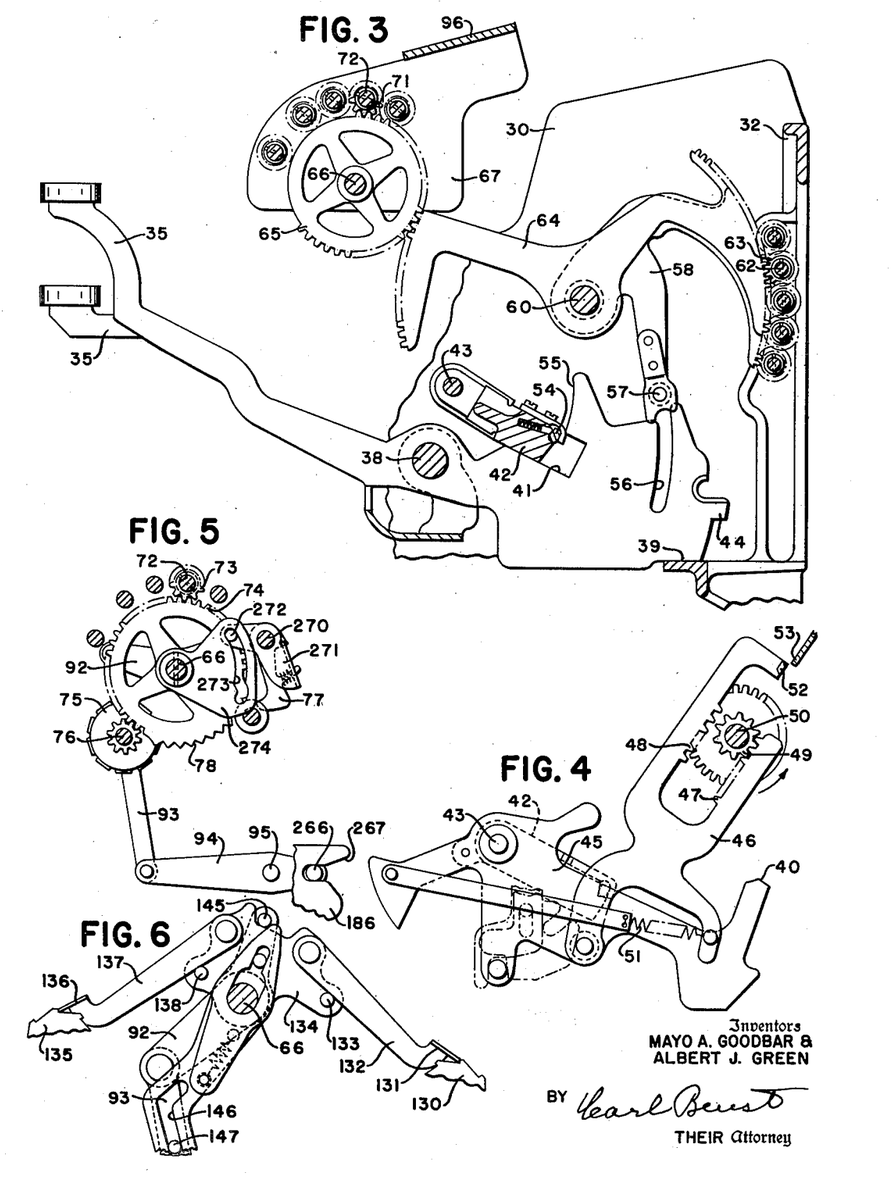
Fig. 3 is a cross-sectional view taken just to the right of one of the amount keys and showing said amount key and its associated mechanism for positioning the corresponding printing wheel.
Fig. 4 is a detail view showing in particular the mechanism for operating the revolution shaft through the medium of the key coupler.
Fig. 5 is a continuation of Fig. 3, showing in detail the connection of the mechanism of Fig. 3 with the corresponding amount type wheel, and also showing the driving means for the consecutive number type wheels.
Fig. 6 is a detail view of a portion of the ribbon feeding mechanism.

As previously explained, the machine embodying the present invention is of the press-down-key type and is provided with the well-known key coupler mechanism for connecting the depressed keys together during a machine operation and for blocking depression of undepressed keys during machine operation, said key coupler through its weight also assisting in returning the keys to undepressed position (Fig. 3), and in which a finished surface on the inward ends of the keys 35, 36, and 37 rests on a corresponding finished surface 39 on the back frame 32. Each of the keys 35, 36, and 37 has therein a slot 41, which cooperates with the inward end of a key coupler 42, rotatably mounted on a shaft 43, supported by the plates 30 and 31 (Figs. 1, 2, and 3). Normally, the weight of the key coupler 42 bearing on the lower surface of the slot 41 in the keys 35, 36, and 37 yieldingly retains said keys in undepressed or home positions, as shown here.

Yieldingly retained in a recess in the upper inward edge of the key coupler 42 (Fig. 3) is a bar 54, for each denominational order of amount keys, one for the transaction keys and one for the department keys, which bars coact with the upper edges of the slots 41 to provide a semi-flexible key arrangement which does not require that all of the amount keys involved in a single transaction be depressed at the same time. Depression of any one of the keys 35, 36, or 37 a slight distance causes the lower surface of the slot 41 therein, in cooperation with the inner end of the key coupler 42, to rock said key coupler counterclockwise a slight distance. Inasmuch as the key coupler 42 swings on a different axis from the keys, the upper edge of the slot 41 of the key being depressed moves over or by-passes the corresponding yieldable bar 54, and, inasmuch as a full-stroke device, to be described presently, prevents retrograde movement of the key coupler 42, further depression of said key may be postponed in case it is desired to depress other keys in different denominations, which likewise may be partially depressed, one at a time, and retained thus by their corresponding yieldable bars 54. After all of the desired keys have thus been partially depressed, full depression of any one of said keys, through the well-known action of the key coupler 42, in cooperation with the slots 41 of the partially depressed keys, will complete the depression of said keys in unison and will also complete the initial counter-clockwise movement of said key coupler 42.

Each of the keys 35, 36, and 37 (Figs. 1, 2, and 3) has an arcuate surface 55, just above the corresponding slots 41, which surface is concentric with the pivot center 43 of the key coupler 42. Consequently initial counter-clockwise movement of said key coupler, upon depression of any one of the keys, causes the inner edge of said key coupler to move opposite the arcuate surface 55 and to obstruct depression of any undepressed keys during machine operation. After the desired keys have been fully depressed, release of the pressure on said keys permits the weight of the key coupler 42, assisted by springs (not shown), to effect its clockwise return movement to return the depressed keys to home position.

Each denominational order of amount keys has a series of the usual and well-known key stops (not shown) coacting with rearward projections 44 (Fig. 3) on said keys, to prevent depression of more than one amount key in each denominational order at the same time. Likewise the transaction keys 36 (Fig. 1) and the department keys 37 have corresponding sets of key stops to prevent depression of more than one of these keys at the same time.

Rotary shaft operating mechanism

As is the usual practice with machines of this type, the present machine is provided with the usual revolution shaft, which is operated by the oscillating movement of the key coupler, said revolution shaft in turn operating mechanism, including a full-stroke device, to enforce complete oscillating movement of the key coupler 42 and associated mechanism.

Secured on the right-hand end of the key coupler 42 (Fig. 4) is a lever 45, having pivotally connected thereto a pitman 46 with inwardly-opposed rack teeth 47 and 48 on parallel extensions thereof, which teeth cooperate with the teeth of the pinion 49, secured on a revolution shaft 50, journaled in the side plates 30 and 31. A spring 51, tensioned between a forward extension of the lever 45 and a rearward extension of the pitman 46, urges said pitman counterclockwise, when said parts are in home position, as shown in Fig. 4, to normally maintain the teeth 47 in engagement with the pinion 49.

Initial counter-clockwise movement of the key coupler 42 and the lever 45, upon depression of a key, as explained earlier, moves the pitman 46 upwardly, causing the teeth 47, in cooperation with the pinion 49, to rotate said pinion and the shaft 50 in a counter-clockwise direction. Immediately after the pitman 46 starts its initial upward movement, a bent-over ear 52 thereon passes over and slides on the outer surface of a guide bar 53 secured to the right plate 31, to retain the teeth 47 in engagement with the pinion 49 during initial movement of said pitman 46. After the ear 52 has moved over the bar 53, and just prior to termination of initial counter-clockwise movement of the key coupler 42, the lever 45, and the pitman 46, the pivot center of said pitman moves above the centerline, or line of pull of the spring 51, and as a result said pitman 46 is immediately urged in a reverse or clockwise direction. Near the terminus of initial counter-clockwise movement of the key coupler 42, the lever 45, and the pitman 46, the ear 52 (Fig. 4) moves beyond the bar 53, whereupon the spring 51 rocks said pitman 46 clockwise to disengage the teeth 47 from the pinion 49 and to simultaneously engage the teeth 48 with said pinion.

Just at the end of initial counter-clockwise movement of the key coupler 42, the lever 45, and the pitman 46, and approximately simultaneously with the shifting of said pitman 46, an angular alining surface 40 (Fig. 4) on an upward extension of said lever 45 engages a corresponding angular alining notch in a disk (not shown) secured on the revolution shaft 50, to retain said shaft and associated parts stationary while the pitman 46 is shifting as explained above, and also to form a positive stop for determining counter-clockwise movement of the key coupler 42 and associated parts, including the keys 35, 36, and 37.

Clockwise return movement of the key coupler 42, the lever 45, and the pitman 46 causes the teeth 48, in cooperation with the teeth of the pinion 49, to continue operation of said pinion and the shaft 50 in a counter-clockwise direction to complete the revolution of said parts. At the beginning of the downward return movement of the pitman 46 (Fig. 4), the ear 52 passes beneath the inner surface of the bar 53 and, in cooperation with said bar, retains the teeth 48 in engagement with the pinion 49 during such return movement of said pitman. As the pitman 46 is being returned clockwise, its pivot point moves beneath the centerline or line of pull of the spring 51, whereupon said spring again urges said pitman in a counter-clockwise direction. As the pitman 46 nears the end of its clockwise return movement, the ear 52 moves beneath the bar 53 (Fig. 4), whereupon the spring 51 rocks said pitman counter-clockwise to disengage the teeth 48 from the pinion 49 and to simultaneously reengage the teeth 47 with said pinion.

A full-stroke device, including a ratchet (not shown) secured on the revolution shaft 50 (Fig. 4) and a pawl coacting therewith, prevents retrograde movement of said shaft and connected parts to insure that said parts, including the key coupler 42, perform a complete cycle of operation each machine operation. The full-stroke device, in cooperation with the yieldable bars 54 (Fig. 3), retains the keys 35, 36, and 37 partially depressed, as explained in connection with the semi-flexible action of said keys, so that additional keys may be depressed prior to complete operation of the machine.

Amount key differential mechanism

Inasmuch as all of the amount keys and their associated differential mechanisms function in the same manner, and inasmuch as the department and clerks keys and their differential mechanisms function in a similar manner, it is believed that a description of the $1.00 key 35 and its differential mechanism, shown best in Fig. 3, will suffice for all.

An enlarged rearward portion of the $1.00 key 35 (Figs. 1 and 3) has therein a cam slot 56, which cooperates with a rod 57 supported by downward extensions of a segment 58 and an arm 59 free on a rod 60 supported by the plates 30 and 31. The segment 58 has teeth which engage a pinion 61 secured on a shaft 62, opposite ends of which are journaled in parallel extensions of the back frame 32. Also secured on the shaft 62 is a pinion 63, similar to the pinion 61, which meshes with teeth in a printer positioning sector 64, also free on the rod 60 and having, in a forward extension thereof, teeth which mesh with a corresponding printer gear 65 free on a shaft 66, opposite ends of which are journaled in printer support plates 67, 68, and 69. The printer support plate 67 is fixedly mounted by means of a bent-over portion 96 thereof secured to the inside surface of the right-hand plate 31. The plate 68 and its companion plate 69 (Figs. 1 and 2) are secured in fixed relationship to each other and to the right plate 31 by means of several studs 70 secured in said plate 31.

The gear 65 (Figs. 1, 3, and 5) meshes with a pinion 71 secured on a shaft 72 journaled in the plates 67, 68, and 69. Also secured on said shaft 72 is a pinion 73, meshing with a gear 74 free on the shaft 66. The gear 74 (Figs. 1 and 5) meshes with a pinion integral with a $1.00 type wheel 75 free on a type wheel shaft 76 journaled in the plates 68 and 69.

Depression of the $1.00 key 35 (Figs. 1 and 3) through the slot 56, in cooperation with the rod 57, rocks the segment 58 clockwise an extent commensurate with the value of said $1.00 key 35. The clockwise movement of the segment 58, through the pinion 61, the shaft 62, and the pinion 63, rocks the sector 64 a like extent in a clockwise direction. Clockwise movement of the sector 64, through the gear 65, the pinion 71, the shaft 72, the pinion 73, and the gear 74 (Fig. 5), positions the $1.00 type wheel 75 in accordance with the value of the $1.00 key 35.

An aliner 77 (Fig. 5) is provided for alining the gear 74 and the type wheel 75 in set positions.

The aliner 77 is free on a rod 270, supported by the plates 68 and 69 (Fig. 1), and said aliner is yieldingly connected to an operating frame 271, also rotatably supported by the rod 270. The operating frame 271 has a forward extension carrying a stud 272, which engages a cam slot 273 in a cam plate 274 fast on the shaft 66. Depression of the $1.00 key 35 for any other amount key, through the key coupler 42 (Fig. 3), rocks the shaft 66 counter-clockwise (Fig. 5), and return movement of said amount key returns said shaft 66 clockwise, in a manner to be described later. Near the end of counter-clockwise movement of the shaft 66 and after the gear 74 and the $1.00 type wheel 75 have been positioned, the cam slot 273, coacting with the stud 272, rocks the frame 271 and the aliner 77 clockwise to yieldingly engage the said aliner with the corresponding one of a series of alining notches 78 in the periphery of said gear 74 to aline said parts in set positions. After the aliner 77 (Fig. 5) has been engaged with the notch 78 as explained above, and near the end of the depression of the $1.00 amount key 35 (Fig. 3), an amount impression hammer 79 (Fig. 2) functions to record the value of said key upon the issuing receipt material, in a manner to be explained later. Clockwise return movement of the shaft 66 and the cam plate 274 (Fig. 5), after the impression has been made, restores the frame 271 and the aliner 77 to disengaged positions.

The other amount keys 35, through mechanisms similar to that for the $1.00 amount key 35, position corresponding type wheels 75 in exactly the same manner as explained in connection with said $1.00 key 35. Likewise the Paid-out and No-sale transaction keys 36 (Figs. 1 and 3) and the department or totalizer selecting keys 37, through their corresponding differential mechanisms, similar to and functioning exactly like the mechanism explained for the $1.00 key 35, position corresponding type wheels, similar to the amount type wheels 75, to record characters representative of the corresponding keys and their functions upon the receipt material.

Consecutive number mechanism

In addition to the amount type wheels 75 and the department and transaction type wheels, the present machine is provided with three orders of consecutive number type wheels 80 (Figs. 1, 14, and 15) for recording the number of receipts issued in any predetermined period. The consecutive number type wheels may be reset to zero by any authorized person whenever desired.

The three consecutive number type wheels 80 are free on the shaft 76 (Figs. 14 and 15), and each of said wheels has secured thereto a feed ratchet 81 with teeth which cooperate with the corresponding one of three graduated teeth on a feed pawl 82 free on a stud 83 extending between the side arms of a yoke 84, said arms being free on the shaft 76 and straddling the three consecutive number type wheels 80. A clearance cut is provided in the feed pawl 82 for a torsion spring 85, which encircles the stud 83 and urges said pawl 82 clockwise (Fig. 15) to normally maintain the teeth of said pawl in yielding engagement with the ratchets 81. Each of the consecutive number type wheels 80 is provided with a retaining pawl 86 free on a stud 87 secured in the plate 68 (Figs. 1 and 14), said pawls being urged clockwise by corresponding springs 88 into engagement with retaining notches formed between the teeth of the corresponding ratchets 81. The retaining pawls 86 are effective to permit clockwise feeding movement of the corresponding consecutive number type wheels 80 and at the same time are effective to prevent retrograde movement of said consecutive number type wheels. An extension of the right arm of the yoke 84 (Fig. 14) carries a stud 89, which cooperates with a cam slot 90 in an arm 91 secured on the shaft 66. Also secured on the shaft 66 is a crank 92, pivotally connected by a link 93 to a lever 94 free on a stud 95 (Figs. 1, 5, and 7) secured in the right plate 31.

Rocking movement first counter-clockwise and back to normal position of the lever 94, as will be explained later, through the link 93, rocks the crank 92, the shaft 66, and the arm 91 also counter-clockwise and back to normal position. Rocking movement of the arm 91 (Fig. 14) by means of the cam slot 90, in cooperation with the stud 89, rocks the yoke 84 and the feed pawl 82 back and forth (Fig. 15), causing the tooth for the units order wheel, in cooperation with the teeth of the corresponding ratchet 81, to advance said wheel one step in a clockwise direction for each operation of the machine. When the units order wheel 80 passes through zero, a deepened notch in the ratchet 81 for said wheel permits the graduated tooth on the feed pawl 82 for the next higher order consecutive number wheel to engage the teeth of the ratchet for said wheel to advance said next higher order wheel one step to transfer a tens digit from the lower order wheel to the adjacent higher order wheel. A similar deepened notch in the ratchet 81 for the second order consecutive number wheel 80 permits the graduated tooth on the pawl 82 for the third order wheel to engage the teeth of the ratchet for said wheel to advance said wheel one step when the two lower order wheels pass through zero for the transfer of hundreds digits in the well-known and usual manner.

A manipulative lever 98 (Figs. 1, 2, and 13) is provided for resetting the consecutive number type wheels 80, and said lever is pivotally mounted by means of an extension thereof free on the right-hand end of a shaft 99 for the five-cent key 35, said shaft being similar to the shaft 72 for the $1.00 key 35. A fingerpiece 100, formed on a forward extension of the lever 98, extends through a clearance slot in the cabinet 34 (Fig. 2) to serve as a medium for manually rocking the reset lever 98 first clockwise and then back to normal position. The lever 98 has, on its periphery, teeth which mesh with the teeth of a pinion 101 secured on the right-hand end of the shaft 76. The shaft 76 (Fig. 15) has formed thereon a longitudinal reset shoulder, which cooperates with the teeth of reset pawls 102, one of which is mounted in a recess in each of the consecutive number type wheels 80. Each of the pawls 102 is urged clockwise by a corresponding spring to maintain its tooth in yielding engagement with the reset shaft 76.

Normally the consecutive number reset lever 98 (Fig. 13) is locked against movement by means of a shoulder 103 thereon in cooperation with a stud 104 in a crank 105 secured on the shaft 106, journaled in the plates 31, 68, and 69 (Fig. 1). Also secured on the shaft 106 is an arm 107 pivotally connected by a link 108 to a lever 109 pivoted on a stud 110 in the right plate 31. The lever 109 carries a stud 111, which coacts with a cam slot 112 in a disk 113 secured on a shaft 114, which extends substantially the full width of the machine and is journaled in the left and right plates 30 and 31 (Fig. 1). Secured on the left-hand end of the shaft 114 (Fig. 12) is a pinion 115, which meshes with teeth formed on an internal arcuate surface on an extension 116 of a machine control lever 117 pivoted on a stud 118 in the left plate 30.

Figures 12, 13, 14, 15, 16, 17, 18:
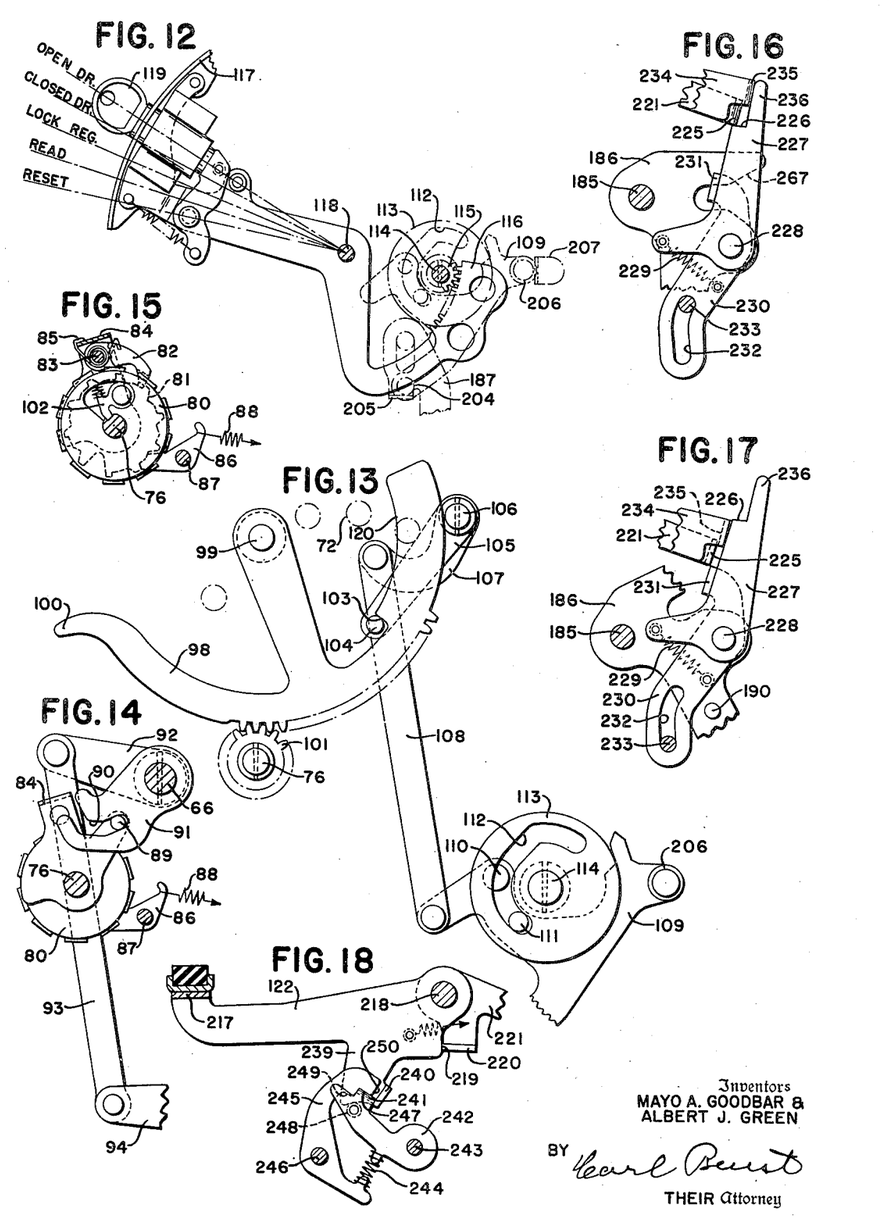
Fig. 12 is a right side elevation of the manually positionable lever and associated mechanism for controlling the various functions of the machine.
Fig. 13 is a detail view of the mechanism for resetting the consecutive number type wheels.
Fig. 14 is a detail view of the mechanism for advancing the consecutive number type wheels.
Fig. 15 is a detail of one of the consecutive number type wheels.
Fig. 16 is a detail of the impression hammer operating mechanism in normal position.
Fig. 17 is a detail of the hammer operating mechanism in operated position.
Fig. 18 is a detail view of the anti-rebound mechanism for one of the impression hammers.

By referring to Fig. 12, it will be seen that the control lever 117 has five positions; namely. Open-drawer position, in which it is shown here and in which position the machine may be operated with the cash drawer either open or closed; Closed-drawer position, in which the machine may be operated only when the cash drawer is closed; Locked register position, in which the machine is locked against operation; Read position, in which either of the totalizers may be read; and Reset position, in which either of the totalizers may be reset. The control lever 117 (Fig. 12) is provided with a lock and a corresponding key 119, with which said lever may be locked in Open-drawer, Closed-drawer, or Locked register position. It is therefore evident that only the possessor of the key 119 may move the control lever 117 to any of its various positions, including Read and Reset positions.

Moving the control lever 117 to either Read or Reset position revolves the shaft 114 and the disk 113, causing the cam slot 112 (Figs. 12 and 13) in said disk 113, in cooperation with the stud 111, to rock the lever 109 clockwise from the position shown here to the position shown in Fig. 2. Clockwise movement of the lever 109, through the link 108, rocks the arm 107, the shaft 66, and the crank 105 also clockwise to move the stud 104 out of the path of the shoulder 103 (Fig. 2) to free the consecutive number reset lever 98 for manipulation. Resetting of the consecutive number type wheels 80 requires a clockwise pickup movement of the reset lever 98 and a counter-clockwise resetting movement of said lever. Clockwise movement of the lever 98, through the teeth thereon, rotates the pinion 101 and the shaft 76 counter-clockwise to cause the resetting shoulder on said shaft 76 to bypass the teeth of the reset pawls 102 for the consecutive number type wheels 80 which are out of zero position. Counter-clockwise return movement of the reset lever 98 revolves the reset shaft 76 clockwise, causing the reset shoulder on said shaft to engage the teeth of the reset pawls 102 for the wheels 80 out of zero position and carry said wheels also clockwise in unison therewith to zero position. When the consecutive number reset lever 98 (Fig. 13) is out of home position, an arcuate surface 120, formed on said lever adjacent the shoulder 103, in cooperation with the stud 104, obstructs return movement of the crank 105, the shaft 106, the arm 107, and the lever 109, which, through the stud 111 and the slot 112, obstructs clockwise movement of the disk 113, the shaft 114, and the pinion 115, thus preventing movement of the control lever 117 out of Reset or Read positions unless said consecutive number reset lever 98 is fully returned to home position, as shown in Fig. 13.

In addition to the type wheels 75 and the consecutive number wheels 80 on the type wheel shaft 76, the present machine is provided with an electro 121 (Figs. 2 and 7) and a corresponding electro impression hammer 122 for recording data of a descriptive or instructive nature upon the receipts.

Inking ribbon mechanism

An inking ribbon 123, which is wound and unwound between reversible ribbon spools 124 and 125 (Figs. 6, 7, and 8), is guided between the impression hammers 79 and 122, the corresponding type wheels 75 and 80, and the electro 121 by guide studs 126 and 127 secured in the plate 68 (Fig. 1). A ribbon shield 128 (Fig. 7), which is supported by the studs 126 and 127, shields the inking ribbon 123 from the web of receipt material 129 to prevent blurring. Suitable clearance openings are provided in the shield 128 for the platens of the impression hammers 79 and 122, so that impressions may be made upon the receipt material 129.

The right-hand ribbon spool 124 (Fig. 7) has integral therewith a ratchet 130, the teeth of which coact with a feeding extension 131 on a right-hand feed pawl 132 pivoted to an operating arm 134 free on the shaft 66. The left-hand ribbon spool 125 has a similar ratchet 135, the teeth of which coact with a feeding extension 136 of a left-hand feed pawl 137 pivoted to the arm 134. The arm 134 (Figs. 6, 7, and 8) carries a stud 139, which engages a reduced portion of a slot 140 in an arm 141, an enlarged portion of said slot 140 freely engaging the shaft 66. A spring 142, tensioned between the arm 141 and an operating arm 143 free on the shaft 66, urges said arm 141 upwardly to normally maintain an operating nose 144 thereon in the path of a stud 145 in said arm 143. The arm 143 has, in a downward extension thereof, a cam slot 146, engaged by a stud 147 in the link 93, which, as previously explained, forms an operating connection between the lever 94, the crank 92, and the shaft 66.

Rocking movement of the lever 94, first counter-clockwise and back to normal position during machine operation, and effected in a manner to be described later, shifts the link 93 first downwardly and then upwardly, causing the stud 147, in cooperation with the cam slot 146, to rock the arm 143 first counter-clockwise and then back to normal position. With the parts in the relative positions shown in Fig. 7, initial counter-clockwise movement of the arm 143 causes the stud 145, in cooperation with the operating nose 144 of the arm 141, to rock said arm and, through the slot 140 and the stud 139, the arm 134 counter-clockwise in unison therewith. Counter-clockwise movement of the arm 134, through the operating extension 136 of the pawl 137, in cooperation with the teeth of the ratchet 135, rotates the left-hand spool 125 counter-clockwise to feed the inking ribbon 123 one increment of movement during each machine operation.

Figures 7, 8:
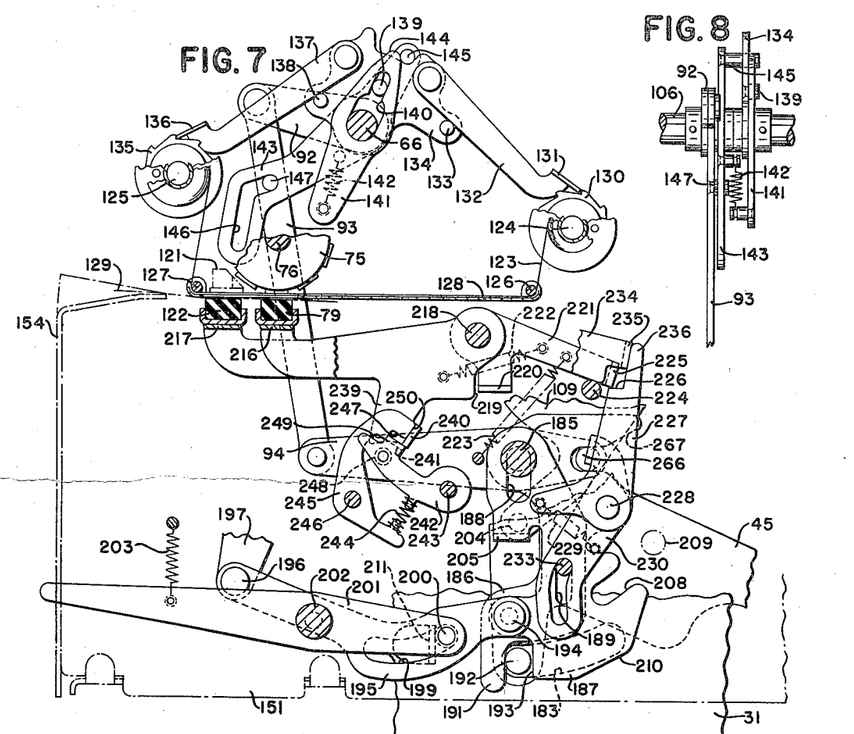
Fig. 7 is a right side elevation showing the important parts of the receipt printing and feeding mechanisms.
Fig. 8 is a side spacing view of a portion of the ribbon feeding mechanism shown in Fig. 7.

Counter-clockwise movement of the arm 134 causes a stud 133 therein, coacting with the lower edge of the pawl 132, to carry said pawl in unison therewith to lift its feeding extension 131 above the teeth of the ratchet 130 to allow retrograde movement of said ratchet and the right-hand spool 124.

Opposite ends of the inking ribbon 123 (Figs. 6, 7, and 8) are anchored to their respective spools 124 and 125; consequently, when all of said inking ribbon has been unwound from the right-hand spool 124, sufficient resistance is imparted to the left-hand spool 125, the pawl 137, and the arm 134 to cause the stud 145 in the arm 143 to by-pass the nose 144 upon counter-clockwise or initial movement of said arm 143. This causes the feeding action of the ribbon mechanism to be reversed, and clockwise return movement of the arm 143 and the stud 145, in cooperation with the nose 144, rocks the arms 141 and 134 clockwise in unison therewith a sufficient distance to cause the pawl 132, in cooperation with the ratchet 130, to rotate the right-hand spool 124 clockwise to wind the inking ribbon 123 onto said spool in exactly the same manner as explained in connection with the left-hand spool 125. In this latter case, clockwise movement of the arm 134 (Fig. 7) causes a stud 138 therein to carry the pawl 137 in unison therewith to lift the feeding extension 136 of said pawl above the teeth of the ratchet 135 so as not to interfere with retrograde movement of said ratchet and the spool 125.

When all of the ribbon has been unwound from the left-hand spool 125, the feeding action of the ribbon mechanism is again reversed in exactly the same manner as explained above.

Receipt material drawer mechanism

Figure 21:
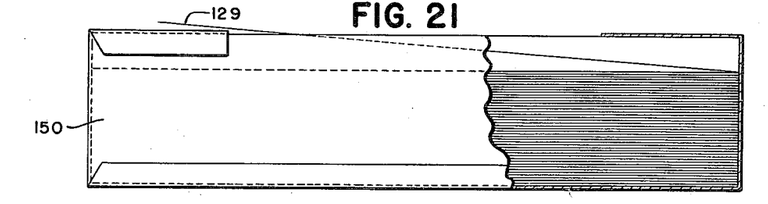
Fig. 21 is a side elevation, partially broken away, showing one form of a package of fanfolded receipt material for use in the machine of this invention.

The supply of issuing receipt material 129 (Figs. 1, 2, and 21) is preferably of fanfolded arrangement to form a compact rectangular package which may, if desired, be contained in a paper box 150 having an opening at the top for the dispensing of said material, in much the same manner as cleansing tissue is packaged and dispensed. The fanfold package 150 is readily insertable in a magazine or drawer 151 formed preferably of sheet material and having a bottom 152, side plates 153, a front door or closure 154 for the insertion of the package of receipt material, and a top door 155 for the convenient threading of the web of the receipt material over the impression hammers 79 and 122 and the receipt material feeding rollers. The sides, bottom, and rearward end of the receipt material drawer 151 may be secured into a rigid structure by spot welding, riveting, or any other suitable means. The receipt material drawer 151 slides back and forth through an opening 156 in the front of the cabinet 34 on a pair of parallel rails 157, which engage the bottom 152 of said drawer, said rails being secured to the machine framework. Flanges 158 (Fig. 2), formed by downward extensions of the side plates 153, fit closely within the rails 157 and cooperate therewith to guide the drawer 151 in its sliding movement and to prevent excessive side displacement of said drawer. Each side plate 153 has a downward extension 159 (Fig. 2), each carrying a stud 160, said studs cooperating with corresponding flanges 161 formed on the rails 157 to sustain the overhanging weight of the drawer 151 when it is pulled forwardly, as shown here. Downward extensions 162 on the forward ends of the flanges 161, in cooperation with the studs 160, determine the extent of the forward or opening movement of the drawer 151. In addition to the extensions 162, hooks extending upwardly from the rails 157 coact with corresponding studs 175 (Fig. 2) in the side plates 153 to assist in terminating the opening movement of the drawer 151. Openings 163, formed in the forward edges of the flanges 161, provide clearance for the studs 160 when it is desired to remove or install the drawer 151. Alining the studs 160 with the openings 163 moves the studs 175 out of coacting relationship with the corresponding hooks, and the downwardly-sloping contour of the upper portion of the drawer 151 adjacent the closure 155 permits said drawer to be lifted upwardly and then forwardly through the opening 156 when it is desired to remove the drawer from the machine.

The front door or closure 154 (Fig. 2) is hinged by means of right- and left-hand brackets 164 (only one shown here) secured thereto, in cooperation with pivot studs 165 secured in the right and left side plates 153 of the drawer 151. The closed position of the door 154 is determined by stop surfaces on the brackets 164, in cooperation with corresponding stop studs 166 secured in the side plates 153. The open position of the door 154 is determined by means of fingers 167 on the brackets 164, in cooperation with the studs 166. The door 154 is latched in closed position, as shown in Fig. 2, by hooks formed on the brackets 164, in cooperation with corresponding studs 168 carried by corresponding latches 169 (only one shown here) pivoted on studs 170 in the side plates 153. The latches 169 have corresponding springs 171, which urge them counter-clockwise to normally maintain a finger 172 thereof in contact with the corresponding studs 166 to determine the effective positions of said latches 169.

When the receipt material drawer 151 is open, as shown in Fig. 2, the latches 169 may be manually moved clockwise against the action of their springs 171 to lift the studs 168 out of the path of the hooks on the brackets 164, whereupon the door 154 may be opened for the purpose of replenishing the supply of receipt material by removing the empty container or box 150 and inserting a new box with a full supply of receipt material therein. If desired, a slot 184 (Fig. 20) may be provided in the door 154, which, with a matching slot in the end of the box 150 (Fig. 21), provides visual means for determining the condition of the supply of receipt material.

The top door or closure 155 (Fig. 2) is hinged on a pin 173, and, when the record material drawer 151 is open, as shown here, said closure 155 may be opened to provide finger room for reaching within the drawer 151 and the box 150 to retrieve the web of the receipt material 129 and carry said web over a guide plate 174, secured between the side plates 153, thence over the impression hammers 79 and 122 and the feed rollers 176, and finally between the side surfaces of a guide depression 177 (Figs. 2 and 20) formed in an inwardly-bent upper portion of the door 154.

After the web of the receipt material 129 has thus been positioned, the upper closure 155 is closed, as shown in Fig. 2, to form a protecting guide for said material. The drawer 151 may then be moved from open position to closed position, in which the guide depression 177, in cooperation with a matching depression 178 in the cabinet 34, provides an exit guide chute for the receipt material 129. Closing the drawer 151 moves the feed rollers 176 directly beneath and into resilient engagement with corresponding pressure rollers 179 secured on a shaft 180 supported by a shiftable framework 181 urged downwardly by compressible springs 182 to normally maintain the receipt material 129 in yielding engagement with the feed rollers 176 for the purpose of advancing said receipt material upon operation of said feed rollers, as will be explained presently.

Figures 9, 10, 11:
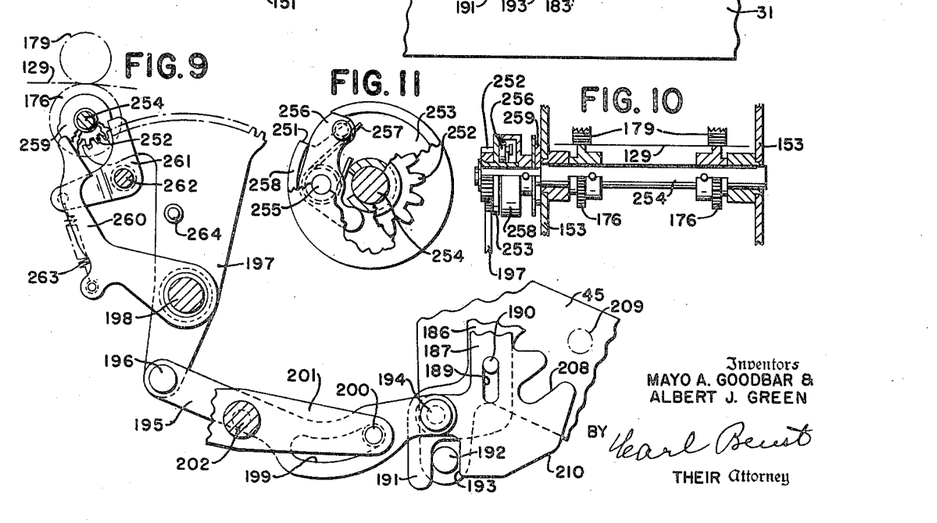
Fig. 9 is a detail view of the receipt feeding mechanism.
Fig. 10 is a side spacing view, partially sectioned, of the receipt feeding rollers and clutch mechanism.
Fig. 11 is an enlarged fragmentary view showing in particular the clutch for the receipt feeding mechanism.

Directing attention to Figs. 1, 7, and 9, the left plate 153 of the drawer 151 has secured thereto a stud 185, which pivotally supports an impression hammer operating arm 186 having contiguous thereto a receipt feed operating arm 187 with a slot 188, which engages the stud 185 to pivotally and shiftably mount said arm 187. The arm 187 has a slot 189 parallel with the slot 188, which engages a stud 190 (Fig. 9) in the arm 186, to form a driving connection between said arms. The arm 186 has a depending finger 191, which cooperates with a driving stud 192 in the lever 45, which, as previously explained, is connected to the key coupler 42 (Fig. 4) for operation in unison therewith. The stud 192 extends through a clearance slot 183 (Figs. 2 and 7) in the right plate 31. The arm 187 has a shoulder 193, which likewise coacts with the stud 192, which stud forms an operating connection between said arms 186 and 187 and the lever 45.

By referring to Figs. 1, 5, and 7, it will be understood that the stud 95 for the lever 94 is in axial alinement with the key coupler shaft 43 and that, when the receipt drawer 151 is closed, the stud 185 is in axial alinement with said stud 95 and said shaft 43.

Initial counter-clockwise movement of the key coupler 42 and the lever 45 (Figs. 4, 7, and 9) causes the stud 192, in cooperation with the shoulder 193, to carry the arm 187 and its companion arm 186 counter-clockwise in unison therewith, and clockwise return movement of the lever 45 causes the stud 192, in cooperation with the finger 191, to return the arm 186 and its companion arm 187 clockwise in unison therewith to home position, as shown here, for the purpose of operating the inking ribbon mechanism, the impression hammers, the consecutive number advancing mechanism, and the receipt feeding mechanism, as will be explained presently.

The arm 187 carries a stud 194 (Figs. 7 and 9), which pivotally supports the inward end of a link 195, the forward end of which is pivoted on a stud 196 in a downward extension of a segment 197 (see also Fig. 1) rotatably supported by a stud 198 secured in the left side plate 153 of the receipt drawer 151. The link 195 has a curved slot 199, engaged by a stud 200 in the rearward end of an On-and-Off lever 201 free on a stud 202 secured in the left plate 153. A spring 203 (Fig. 7) is tensioned to urge the lever 201 in a clockwise direction to yieldingly maintain the arm 187 in its downward position, as shown here, so that the shoulder 193 is normally in the path of the operating stud 192.

Moving the On-and-Off lever 201 (Figs. 7 and 9) from On position, as shown here, counter-clockwise against the action of the spring 203 to Off position, through the stud 200 in cooperation with the slot 199, raises the link 195 and the arm 187 to move the operating shoulder 193 above and out of the path of the operating stud 192 to disconnect said arm 187 and its companion arm 186 from the lever 45, to prevent operation of the receipt printing and issuing mechanism.

If desired, any suitable retaining mechanism may be used for yieldingly retaining the On-and-Off lever 201 in its Off position for the purpose of throwing off or disabling the receipt printing and issuing mechanism during certain operations of the machine.

When the On-and-Off lever 201 (Figs. 1 and 7) is in On position, the stud 200 is in the path of a right-angle bracket 211 secured to the outer surface of the right plate 31 to secure the receipt material drawer 151 against opening under such circumstances. Moving the lever 201 to Off position lifts the stud 200 out of the path of the bracket 211, so that the drawer 151 may be opened.

Mechanism governed by the control lever 117 (Fig. 2) is provided for locking the arm 187 and connected mechanism, including the On-and-Off lever 201, against movement to Off position except when said control lever 117 is in either Read or Reset position.

As previously explained, when the control lever 117 (Figs. 7, 12, and 13) is in other than Read or Reset position, the cam slot 112 in the disk 113, in cooperation with the stud 111, retains the lever 109 in its counter-clockwise position, as shown here. When the lever 109 is in its counter-clockwise position, a stud 204 in a downward extension thereof, in cooperation with a bent-over ear 205 on the arm 187, obstructs upward movement of said arm and, as a result, locks said arm and the On-and-Off lever 201 (Fig. 7) in On position. Moving the control lever 117 to either Read or Reset position rotates the disk 113 (Figs. 12 and 13) counter-clockwise in the manner previously explained, causing the cam slot 112, in cooperation with the stud 111, to rock the lever 109 clockwise to the position shown in Fig. 2, to move the stud 204 out of the path of the ear 205 to free the arm 187 for upward movement under influence of the On-and-Off lever 201 (Fig. 7) when said lever is moved to Off position.

When the control lever 117 (Figs. 2, 7, 12, and 13) is in other than Read or Reset position, a stud 206, carried by the lever 109, is in the path of a bracket 207 secured to the left side plate 153 of the receipt drawer 151 to prevent the opening of said drawer. Moving the control lever 117 to either Read or Reset position rocks the lever 109 and the stud 206 clockwise to move said stud out of the path of the bracket 207, so that the drawer 151 may be opened. Obviously, movement of the control lever 117 from either Read or Reset position to any other position, while the drawer 151 is open, moves the stud 206 into the path of the bracket 207 to prevent the closing of said drawer under such conditions.

The arm 187 (Figs. 7 and 9) has a guide slot 208, which engages a fixed stud 209 in the left side plate 153 of the drawer 151 (Fig. 2) when said arm 187 is rocked counter-clockwise, to insure that the shoulder 193 remains in the path of the stud 192 and to obstruct movement of the On-and-Off lever 201 to Off position after machine operation has begun.

From the foregoing description, it is evident that it is impossible to open the receipt drawer 151 (Fig. 2) when the control lever 117 (Fig. 12) is in other than Read or Reset position; and it is also evident that it is impossible to fully close the drawer when said control lever 117 is in other than Read or Reset position.

With the control lever 117 in Read or Reset position and the On-and-Off lever 201 (Figs. 1 and 7) in On position, as shown here, closing the receipt mechanism drawer 151 causes a camming surface 210, formed on the lower edge of the arm 187, to engage and ride over the stud 192 against the action of the spring 203. This shifts the arm 187, the link 195, and the stud 200 upwardly to lift said stud above the bracket 211 and to lift the shoulder 193 above the stud 192. As the shoulder 193 moves beyond the stud 192, the spring 203 returns said arm 187 downwardly to return said shoulder into the path of said stud 192 and to return the stud 200 into the path of the bracket 211.

*Impression hammer mechanism*

The impression hammers 79 and 122 (Figs. 1, 2, and 7) comprise, respectively, right- and left-hand yoked arms connected by bails 216 and 217, said arms being pivoted on a rod 218 supported by the side plates 153 of the receipt mechanism drawer 151. The left-hand arm of the electro-hammer 122 has a shoulder 219, which coacts with a right-angled extension 220 on an operating arm 221 free on the rod 218. A spring 222, tensioned between the left arm of the hammer 122 and the arm 221, urges said parts toward each other to normally maintain the extension 220 in yielding engagement with the shoulder 219, as shown in Fig. 18. A hammer-operating spring 223, tensioned between the arm 221 and a stationary stud, urges said arm and the electro-hammer 122 clockwise to normally maintain said arm 221 in yielding engagement with a stop stud 224 secured in the left side plate 153 of the drawer 151. The arm 221 (Figs. 7 and 16) has a bent-over ear 225, which cooperates with a shoulder 226 formed on a hammer-actuating pawl 227 free on a stud 228 in the arm 186. A spring 229, tensioned between the pawl 227 and an arm 230 free on the stud 228, urges said parts in opposite directions to normally maintain a bent-over ear 231 on said arm 230 in yielding contact with the outward edge of the pawl 227. The lower end of the arm 230 (Figs. 7 and 16) has a cam slot 232, which embraces a stud 233 fast in the left plate 153, said stud 233 being in substantially axial alinement with the stud 190, when the arms 186 and 187 are in home position (compare Figs. 7 and 9).

Initial counter-clockwise movement of the impression operating arm 186 (Figs. 1, 7, and 16), through the stud 228, carries the pawl 227 and the arm 230 counter-clockwise in unison therewith. Counter-clockwise movement of the pawl 227, through the shoulder 226, in cooperation with the ear 225, carries the arm 221 and the electrohammer 122 counter-clockwise in unison therewith against the action of the spring 223 to stretch said spring and to cock said electrohammer. After the electrohammer 122 has been sufficiently cocked, the cam slot 232 (Figs. 16 and 17), in cooperation with the stationary stud 233, rocks the arm 230 and, through the ear 231, the pawl 227 clockwise to disengage the shoulder 226 from the ear 225 to release the arm 221 and the electrohammer 122 to the action of the hammer spring 223 (Fig. 7). The spring 223 is of sufficient strength to return the arm 221 and the hammer 122 sharply clockwise until such movement of said arm 221 is terminated by engagement thereof with the stop stud 224. The spring 222, which forms a yieldable connection between the arm 221 and the left arm of the hammer 122, is sufficiently weak to permit said hammer 122 to travel by its own momentum a slight distance counter-clockwise independently of the arm 221, and during this independent movement the platen or impression block of said hammer 122 carries the receipt material 129 and the inking ribbon 123 (Figs. 1 and 7) into sharp contact with the electro 121 to print the data thereon upon the face of the issuing receipt.

In Fig. 17, the arm 186, the pawl 227, and the arm 230 are shown in fully-operated or counter-clockwise position, in which position the shoulder 226 is disengaged from the ear 225 of the arm 221 to operate the electrohammer in the manner explained above. Clockwise return movement of the arm 186 from the position shown in Fig. 17 to the positions shown in Figs. 7 and 16 causes the shoulder 226 of the pawl 227 to by-pass the ear 225, whereupon the spring 229 returns said shoulder into the path of said ear in preparation for the next machine operation.

While some of the parts are not shown in detail, the amount and consecutive number impression hammer 79 (Figs. 1 and 7) has on its left arm a shoulder, similar in every respect to the shoulder 219 on the left arm of the hammer 122, which cooperates with a right-angled extension of a hammer-operating arm 234, said extension similar in every respect to the extension 220 of the hammer-operating arm 221. The arm 234 has a bent-over ear 235 (Figs. 7, 16, and 17), which coacts with the shoulder 226 as explained for the ear 225, to operate the impression hammer 79 in exactly the same manner as explained for the hammer 122. It will be noted that the ear 235 (Figs. 7 and 16) is offset in relation to the ear 225, so that the impression hammer 79 will not operate until immediately after the impression hammer 122 has completed its operation, thus obtaining a better operating condition by distributing the vibration and jar in connection with the impression stroke of the hammers. An upwardly-extending finger 236 (Figs. 7 and 16) of the pawl 227 coacts with the ear 235 to determine the counter-clockwise position of said pawl 227 and the shoulder 226 in relation to said ear 235 and the ear 225 for the arm 221.

*Anti-rebound mechanism for hammers*

The impression hammers 79 and 122 (Figs. 1, 7, and 18) are provided with an anti-rebound mechanism to prevent blurring of the impression by rebounding strokes of said hammers. In the present disclosure, the anti-rebound mechanism is shown only in connection with the electrohammer 122. However, there is a similar rebound mechanism for the consecutive number and amount hammer 79.

The anti-rebound mechanism functions after the impression blows of the hammers have been completed and prevents repeat or rebounding blows of the hammers, thereby eliminating the possibility of a double print or of the blurring of the printed data upon the receipt.

In Fig. 7, the hammers 79 and 122 are shown at the instant the receipt material and the inking ribbon are impressed against the electro and the type wheels to make the printed record. This is not the normal position of said hammers, as they immediately rebound and are retained in normal position, as shown in Fig. 18, by the anti-rebound mechanism.

The left arm of the electrohammer 122 has a downward extension 239 with a right-angled ear 240, which coacts with a corresponding ear 241 on an anti-rebound pawl 242 free on a stud 243 in the left plate 153 of the receipt drawer 151. A compressible spring 244, compressed between the anti-rebound pawl 242 and a companion latch 245 free on a stud 246 in the left plate 153, urges said parts clockwise to cause said pawl 242 to coact properly with the ear 240 and to cause said latch 245 to coact properly with the ear 241 on said pawl 242.

When the electrohammer 122 is in normal or rebound position, as shown in Fig. 18, the ear 240 thereon is engaged by the ear 241 on the pawl 242 to obstruct a repeat clockwise movement of said hammer 122 after the impression stroke has been completed. When the pawl 242 is effective, as shown in Fig. 18, a surface 247 on the latch 245 engages the ear 241 to limit the clockwise movement of said pawl 242 under influence of the spring 244. With the hammer 122 in normal position (Fig. 18), counter-clockwise cocking movement of said hammer, in the manner explained above, causes a downward surface on the extension 239 to engage a stud 248 in the pawl 242 and rock said pawl counter-clockwise against the action of the spring 244 until the ear 241 moves beyond a downward shoulder 249 on the latch 245. After the ear 241 moves beyond the shoulder 249, the spring 244 urges the latch 245 clockwise to move said shoulder 249 over said ear 241 to latch the anti-rebound pawl 242 in ineffective position.

As previously explained, after the hammer 122 has been cocked, the shoulder 226 (Fig. 17) on the pawl 227 is rocked out of engagement with the ear 225 on the arm 221 to release said arm and said hammer 122 to the action of the spring 223, which spring immediately urges said parts clockwise for the impression stroke. Clockwise movement of the hammer 122 causes the ear 240 (Figs. 7 and 18) to engage a rearward surface 250 on the nose of the latch 245 to carry said latch counter-clockwise to disengage the shoulder 249 from the ear 241, whereupon the spring 244 immediately urges the pawl 242 a slight distance clockwise until the upper surface of the ear 241 contacts the lower edge of the ear 240. The contact of the platen of the hammer 122 with the electro 121 (Fig. 7) causes said hammer to rebound a slight distance in a counter-clockwise direction to move the ear 240 out of the path of the ear 241, whereupon the spring 244 completes clockwise movement of the pawl 242 to the position shown in Fig. 18, in which position said ear 241, in cooperation with the ear 240, obstructs a rebounding clockwise movement of the hammer 122, thus preventing a repeat print or a blurring of the printed matter on the face of the receipt.

A similar anti-rebound mechanism (not shown) is provided for the hammer 79 to prevent rebounding of said hammer after the impression stroke.

The rebound-preventing mechanism shown in Figs. 7 and 18 of the present disclosure is similar in many respects to the rebound-preventing mechanism shown in Figs. 1 and 11 of the United States Patent No. 2,342,082, issued February 15, 1944, to Joseph J. Klosterman.

*Receipt-feeding mechanism*

After the hammers 79 and 122 (Figs. 1, 2, and 7) have completed their impression stroke, to record the desired data upon the face of the receipt, the receipt-feeding mechanism functions to advance the web of the receipt material so that the finished receipt may be removed, and to prepare for the printing of a succeeding receipt.

By referring to Figs. 7 and 9, it will be recalled that the arm 187 is connected by the link 195 to the lower end of the receipt-feeding segment 197, which segment is rotatably supported by the stud 198. The segment 197 (Figs. 1, 9, 10, and 11) has, on its periphery, teeth which mesh with corresponding teeth in a pinion 252 secured on a sleeved portion of a disk 253, said sleeved portion being rotatably supported on a receipt feed shaft 254 journaled in hubs secured in the side plates 153 of the receipt drawer 151. The shaft 254 has secured thereon the two receipt feeding rollers 176, which coact with the corresponding pressure rollers 179 when the receipt drawer 151 is closed. The disk 253 (Figs. 10 and 11) carries a stud 255, which rotatably supports a receipt feed pawl 256 urged counter-clockwise by a torsion spring 257 to normally maintain the tooth of said pawl in engagement with an operating notch 251 in the flanged portion of a feed drum 258 secured on the shaft 254.

Integral with the drum 258 (Figs. 9, 10, and 11) is a positioning disk 259 having a stop notch engageable by the upper end of a stop pawl 260 free on the stud 198, and having another stop notch engageable by the upper end of a stop pawl 261 free on a stud 262 in the left plate 153. A spring 263, tensioned between the pawls 260 and 261, urges said pawls in opposite directions or toward each other to normally maintain their upper ends in yielding engagement with the corresponding notches in the disk 259 to locate and hold the shaft 254 and parts thereon in home position.

By referring to Figs. 1 and 10, it will be remembered that the pressure rollers 179 maintain the web of the receipt material 129 in yielding contact with the feed rollers 176, and it will be noted that both sets of rollers have their peripheries serrated or knurled to form fine teeth to better feed the receipt material.

Initial counter-clockwise movement of the key coupler 42 and the lever 45 (Figs. 7 and 9), through the stud 192, in cooperation with the shoulder 193, carries the arm 187 in unison therewith through approximately 26½ degrees of movement. Counter-clockwise movement of the arm 187, through the link 195, rocks the segment 197 counter-clockwise in unison therewith. Counter-clockwise movement of the segment 197 revolves the pinion 252, the disk 253, and the pawl 256 clockwise, as viewed in Fig. 9, and counter-clockwise as viewed in Fig. 11. During this idle or take-up movement, the outside surface of the pawl 256 wipes freely over the internal periphery of the flange of the drum 258 without imparting any movement to said drum, the shaft 254, and the feed rollers 176 (Fig. 10). As the segment 197 (Fig. 9) nears the terminus of its initial counter-clockwise movement, a roller 264 carried thereby engages an inside surface on the pawl 260 and rocks said pawl counter-clockwise against the action of the spring 263 out of engagement with the corresponding stop notch in the disk 259 to free said disk and the shaft 254 for feeding movement in a counter-clockwise direction, as viewed here. During its initial movement, the segment 197 imparts a complete counter-clockwise revolution to the pinion 252, the disk 253, and the pawl 256, as viewed in Fig. 11, to cause said pawl to again engage the notch 251 in the flange of the drum 258, as shown here.

With the pawl 256 engaged with the notch 251 in the flange of the drum 258 and with the pawl 260 disengaged from its notch in the disk 259, clockwise return movement of the segment 197, under influence of the arm 187, revolves the pinion 252, the disk 253, and the pawl 256 counter-clockwise, as viewed in Fig. 9, and clockwise, as viewed in Fig. 11. This movement of the disk 253 and the pawl 256 causes said pawl, in cooperation with the notch 251, to carry the drum 258, the disk 259, the shaft 254, and the feed rollers 176 in unison therewith one complete revolution to feed the web 129 of the receipt material forwardly as viewed in Figs. 1, 2, and 9. This moves the printed portion of said receipt material the proper distance beyond the edge of a tearing blade or knife 265 (Fig. 2) secured in the framework for the pressure rollers 179, which blade is used for tearing or separating the finished receipt, shown in Fig. 19, from the web 129.

As the shaft 254, the drum 258, and the disk 259 complete their counter-clockwise feeding movement (Fig. 9), the stop and locating notches in said disk 259 are again engaged by the upper ends of their corresponding pawls 260 and 261 to locate and hold the feeding mechanism in normal or home position. It will be noted in this respect that the pawl 261 prevents retrograde movement of the disk 259, the drum 258, and the shaft 254 during initial movement of the segment 197 and the pinion 252, and that the pawl 260 prevents feeding movement of said parts until after said segment 197 and said pinion 252 have completed their initial movements.

It will be remembered that movement of the On-and-Off lever 201 counter-clockwise from On position, as shown in Fig. 7, to Off position, through the stud 200, in cooperation with the slot 199, lifts the link 195 and the arm 187 to move the driving shoulder 193 of said arm out of the path of the stud 192 to disable the impression mechanism and the receipt-feeding mechanism.

A receipt-feeding mechanism similar in many respects to that disclosed in the present application is disclosed in Figs. 8, 9, and 10 and the description thereof in the previously-referred-to United States Patent No. 2,342,082.

*Consecutive number, inking ribbon, and type wheel aliner driving mechanism*

By referring to Figs. 1, 5, and 7, it will be recalled that the fixed stud 95, which rotatably supports the operating lever 94 for the consecutive number, inking ribbon, and type aliner mechanisms, is in axial alinement with the key coupler shaft 43 and also with the stud 185 when the receipt material drawer 151 is closed. The lever 94 carries a stud 266, which is engaged by an operating notch 267 in the arm 186 when the drawer 151 is closed. Consequently, rocking movement, first counter-clockwise and then back to normal position, of the arm 186 rocks the lever 94 and, through the link 93, rocks the crank 92 and the shaft 66 first counter-clockwise and then back to normal position, in unison therewith, to advance the consecutive number type wheels 80 (Fig. 14), to actuate the ribbon feeding mechanism (Fig. 7) and to actuate the aliner 77 (Fig. 5) in the manner explained earlier herein.

It will be noted that the notch 267 in the arm 186 for the stud 266 (Figs. 5 and 7) is flared at its open end to permit easy engagement of said notch with said stud in case of any misalinement between said parts when the receipt drawer 151 is moved from open position to closed position.

The On-and-Off lever 201 (Figs. 1, 2, and 7), which controls the receipt-feeding and impression mechanisms, likewise controls the operation of the consecutive number mechanism, the ink ribbon mechanism, and the type wheel aliner mechanism, which mechanisms are all operated by the arms 186 and 187 (Figs. 7 and 9), which are in turn directly controlled by said On-and-Off lever 201.

Summarizing briefly, it will be understood that the present invention is directed to novel receipt printing and issuing mechanisms which are contained in a sliding magazine or drawer which may be moved outwardly from closed or working position to open position for the replenishing of the receipt material supply, which in the present instance is contained in a compact fanfolded package. The receipt material supply may be inserted in a convenient opening in the front of the receipt material drawer, access to said opening being had by a convenient closure therefor. Likewise, the receipt material drawer and its contents may be readily and easily removed from the machine in case it is desirable or necessary to adjust or repair the receipt impression and/or feeding mechanisms.

The present machine is provided with the usual manually positionable control lever for controlling the various functions of said machine, and only when said control lever is in either Read or Reset position is it possible to move the receipt drawer from closed position to open position or vice versa. The operation of the impression mechanism and the receipt-feeding mechanism is controlled by an On-and-Off lever which is likewise under control of the machine control lever, and said On-and-Off lever is locked in On position except when the control lever is in either Read or Reset position. The On-and-Off lever likewise controls the opening of the receipt drawer, and it is necessary that said lever be in Off position before the drawer may be moved from closed position to open position. However, the On-and-Off lever does not control the closing of the receipt drawer, as said drawer may be closed regardless of which position said lever is in.

It is believed that a further statement of operation in connection with the receipt printing and issuing mechanism of the present invention is unnecessary in the present instance, as a full understanding of such operation will have been obtained from a careful reading of the preceding specification.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, constructed and arranged to record data on a receipt strip and to advance said strip, the combination of a drawer-like receptacle for the receipt strip supply; impression means mounted in the receptacle; receipt strip advancing means mounted in the receptacle, said receptacle movable from an operating or working position to a loading position to facilitate the placing of a new supply of receipt strip therein and to facilitate threading the web of said receipt strip over the impression means and the advancing means; a first member connected to the advancing means; a second member connected to the impression means, said members connected to each other for unitary movement and constructed and arranged to receive an initial and a return oscillating movement each machine operation for actuating the impression means and the advancing means; means effective when the receptacle is in working position and coacting with the first member to impart initial movement to the members and to the impression and advancing means, said means coacting with the second member to impart return movement to the members and to the impression and advancing means; and means to move the first member out of coacting relationship with the imparting means to disable the impression means and the advancing means.

2. In a machine of the class described, constructed and arranged to record data on a receipt strip and to advance said strip, the combination of a drawer-like receptacle for the receipt strip supply; impression means mounted in the receptacle; receipt strip advancing means mounted in the receptacle, said receptacle movable from a working position to a loading position to facilitate the insertion of a new supply of receipt strip therein and to facilitate threading the web of said receipt strip over the impression means and the advancing means; a first member operatively connected to the advancing means; a second member operatively connected to the impression means, said members connected to each other for unitary movement and constructed and arranged to receive an initial movement and a return movement for operating the impression means and the advancing means; an operating element having a fixed back-and-forth movement each machine operation, said element coacting during its initial movement with the first member to impart initial movement to the members and to the impression means and the advancing means, said operating element coacting during its return movement with the second member to impart return movement to the members and to the impression means and the advancing means; and means to move the first member out of the path of the operating element to disable the impression means and the advancing means.

3. In a machine of the character described, constructed and arranged to record data on a receipt strip and to feed said strip, the combination of a drawer to receive the receipt strip supply, which supply is preferably in the form of a rectangular fanfold package; recording hammers supported by the drawer; receipt strip feeding means supported by the drawer; a first member operatively connected to the feeding means; a second member operatively connected to the hammers; means to connect the members together for unitary initial and return movement; means, including a lever, performing a uniform back-and-forth movement each machine operation, said lever coacting with the first member to impart initial movement to the members, the hammers, and the feeding means, said lever coacting with the second member to impart return movement to the members, the hammers, and the feeding means; and means to move the first member independently of the second member, and out of coacting relationship with the lever to disable the members, the hammers, and the feeding means.

4. In a machine of the class described, constructed and arranged to record data on a receipt strip and to feed said strip, the combination of a drawer to receive the receipt strip supply, which supply is preferably in the form of a rectangular fanfolded package; impression means supported by the drawer; receipt strip feeding means supported by the drawer, said impression means having an initial working movement and a return take-up movement, and said feeding means having an initial take-up movement and a return working movement; a first member operatively connected to the feeding means; a second member operatively connected to the impression means, said members connected together for unitary movement; driving means for the members, said driving means having a uniform initial and reverse movement, and coacting, during its initial movement, with the first member when the drawer is in working position, to impart such movement to the members, the impression means, and the feeding means, said driving means coacting, during its reverse movement, with the second member when the drawer is in working position, to impart such movement to the members, the impression means, and the feeding means to cause the data to be recorded upon the receipt strip and to cause said strip to be properly fed; and means to move the first member out of coacting relationship with the driving means to disable the members, the impression means, and the feeding means.

5. In a machine of the character described, constructed and arranged to record data on a receipt strip and to feed said strip, the combination of a drawer to receive the receipt strip supply, which is preferably in the form of a rectangular fanfolded package; impression means supported by the drawer; record strip feeding means supported by the drawer, said impression means having an initial working movement and a return take-up movement and said feeding means having an initial take-up movement and a return working movement; a first member operatively connected to the feeding means; a second member operatively connected to the impression means, said members connected to each other for unitary rotary movement about a common axis; a driving element having a constant back-and-forth movement each machine operation; means carried by the element and coacting during initial movement of said element with the first member to impart initial movement to the members, the impression means, and the feeding means, said means coacting during final movement of said element with the second member to impart return movement to the members, the impression means, and the feeding means; and means to move the first member with respect to its axis out of coacting relationship with the imparting means to render the members, the impression means, and the feeding means inoperative.

6. In a machine of the character described, constructed and arranged to record data on a receipt strip and to feed said strip, the combination of a drawer to receive the receipt strip supply, which is preferably in the form of a rectangular fanfolded package; recording hammers supported by the drawer; means to actuate the hammers, said means supported by the drawer; receipt strip feeding means supported by the drawer, said hammer-actuating means having an initial hammer-operating movement and a return idle movement and said feeding means having an initial idle movement and a return feeding movement; a first member operatively connected to the feeding means; a second member operatively connected to the hammer-actuating means, said members connected together for unitary movement about a common axis; a constant displacement element for driving the members; means carried by the element and located intermediate the members, when the drawer is closed, said means coacting during its first movement with the first member to impart initial movement to the members, the hammer-actuating means, and the feeding means, said means coacting during its final movement with the second member to impart return movement to the members, the hammer-actuating means, and the feeding means; and means to move the first member contrary to its axis and out of coacting relationship with the imparting means to render the hammer-actuating means and the feeding means inoperative.

7. In a machine of the class described, constructed and arranged to record data on receipt material and to feed said material, the combination of a drawer to house the supply of receipt material; means to record data on the receipt material, including type wheels and inking media, mounted in the machine proper, and coacting impression means mounted in the drawer; means to feed the receipt material, including pressure means mounted in the machine proper, and coacting feeding means mounted in the drawer, said drawer movable from working position to a more accessible position for replenishing the supply of receipt material and for threading the web of said material over the impression means and the feeding means; a first arm operatively connected to the feeding means; a second arm operatively connected to the impression means, said arms and said feeding and impression means having an invariable pattern of movement during each machine operation; means to connect the arms for unitary operating movement; driving means having an invariable back-and-forth movement each machine operation and constructed and arranged to coact with the arms when the drawer is in working position, said driving means coacting with the first arm to impart initial movement to the impression means and the feeding means, said driving means coacting with the second arm to impart return movement to the impression means and the feeding means; and means to move the first arm out of coacting relationship with the driving means to disable the impression means and the feeding means.

8. In a machine of the class described, capable of various types of operations and having a positionable control element for conditioning said machine for said various operations, said machine also constructed and arranged to print data on receipt material and to feed said receipt material, the combination of a drawer to house the supply of receipt material; means to print data on the receipt material, including type media and inking media mounted in the machine proper, and coacting impression means supported by the drawer; means to feed the receipt material, including pressure means mounted in the machine proper and coacting feeding means supported by the drawer, said drawer movable from closed or working position to open or a more accessible position for replenishing the supply of receipt material and for threading the web of said material over the impression means and the feeding means; a first member operatively connected to the feeding means; a second member operatively connected to the impression means and to the first member, said members and said feeding and impression means having an invariable pattern of back-and-forth movement each machine operation; driving means in coacting relationship with the members when the drawer is in working position, said driving means having an invariable pattern of back-and-forth movement, and coacting during its first movement with the first member to impart initial movement to the members and to the impression and feeding means, said driving means coacting during its return movement with the second member to impart return movement to the members and to the impression and feeding means; means to move the first member out of coacting relationship with the driving means to disable the impression means and the feeding means; and means controlled by the control element when in certain positions to secure the drawer in working position and to secure the first member in coacting relationship with the driving means.

9. In a machine of the class described arranged to print data on receipt material and to feed said receipt material, the combination of a drawer to house the supply of receipt material, said drawer having a closed operating position and an open position for the insertion of a new supply of receipt material; printing media mounted in the machine proper; impression hammers mounted in the drawer, said hammers coacting with the printing media when the drawer is closed to record data on the receipt material; means including a first arm to operate the hammers, said means mounted in the drawer and having an initial movement to operate the hammers and an idle return movement; pressure means mounted in the machine proper; feeding means mounted in the drawer, said means coacting with the pressure means when the drawer is closed to feed the receipt material; means including a second arm to operate the feeding means, said means mounted in the drawer and having an initial idle movement and a return movement to operate the feeding means; means to connect the arms for unitary initial and return movement; a device mounted in the machine proper and having a uniform initial and return movement, said device coacting during its initial movement with the second arm to impart initial movement to the arms and connected mechanism, said device coacting during its return movement with the first arm to impart return movement to the arms and connected mechanism; and means to move the second arm out of coacting relationship with the device to disable the receipt printing and feeding mechanisms.

10. In a machine of the class described, constructed and arranged to print data on receipt material and to feed said receipt material, the combination of a drawer to house the supply of receipt material, said drawer having a closed or working position and an open or more accessible position for placing a new supply of receipt material therein; type media and coacting inking media mounted in the machine proper; impression hammers mounted in the drawer and effective when said drawer is in working position to coact with the type and the inking media; pressure rollers mounted in the machine proper; feeding rollers mounted in the drawer and effective when said drawer is in working position to coact with the pressure rollers to feed the receipt material; means, including a first member, to actuate the feeding rollers, said means having an initial take-up movement and a final working movement; means including a second member to actuate the hammers, said means having an initial working movement and a final take-up movement; means to connect the members for unitary movement; means having an invariable back-and-forth movement each machine operation, and coacting during its first movement with the first member, when the drawer is in working position, to impart initial movement to the members, said imparting means coacting during its second movement with the second member, when the drawer is in working position, to impart final movement to the members; and means to move the first member out of coacting relationship with the imparting means to disable the members, the impression hammers, and the feeding rollers.

11. In a machine of the class described, constructed and arranged to print records on an issuing record strip and to feed said strip, the combination of a drawer to house the supply of record strip, said drawer mounted in the machine and movable from a closed position to an open or more accessible position; a printing couple, including one portion mounted in the machine and another portion mounted in the drawer, said portions being in operative printing relationship to each other when the drawer is closed; and a feeding couple, including one portion mounted in the machine and another portion mounted in the drawer, said portions being in operative feeding relationship to each other when the drawer is closed, said drawer being so constructed and arranged that when it is open the supply of record strip may be replenished and the web of said record strip may be placed in coacting relationship with the portions of the feeding and printing couples in the drawer, said web movable into coacting relationship with the portions of the feeding and printing couples in the machine when the drawer is closed.

12. In a machine of the class described, arranged to print records on a strip of record material and to feed said strip, the combination of a drawer-like receptacle movable into and out of the machine, and constructed and arranged to house a supply of the record strip; printing mechanism, including one portion mounted in the machine proper and another portion mounted in the drawer, said portions being in operative printing relationship with each other when the drawer is in its innermost position; feeding mechanism for the record strip, including one portion mounted in the machine proper and another portion mounted in the drawer, said portions being in operative feeding relationship with each other when the drawer is in its innermost position, said drawer being so constructed and arranged that when it is in its outermost position the supply of record strip may be replenished and the web of said strip placed in coacting relationship with the portions of the printing and feeding mechanisms in said drawer, said web movable into coacting relationship with the portions of the printing and feeding mechanisms in the machine proper when the drawer is moved to its innermost position; and driving means mounted in the machine and coacting with the portions of the feeding and printing mechanisms in the drawer, when said drawer is in its innermost position, to drive said printing and feeding mechanisms.

13. In a machine of the class described, constructed and arranged to print records on a record strip and to feed said strip, the combination of a drawer-like receptacle movable into and out of the machine, and constructed and arranged to house a supply of the record strip; printing mechanism, including one portion mounted in the machine proper and another portion mounted in the drawer, said portions being in operative printing relationship with each other when the drawer is in its innermost position; feeding mechanism for the record strip, including one portion mounted in the machine proper and another portion mounted in the drawer, said portions being in operative feeding relationship with each other when the drawer is in its innermost position, said drawer being so constructed and arranged that when it is in its outermost position the supply of record strip may be replenished and the web thereof placed in coacting relationship with the portions of the printing and feeding mechanisms mounted in said drawer, said web movable into coacting relationship with the portions of the printing and feeding mechanisms mounted in the machine proper when the drawer is moved to its innermost position; a first operating member connected to the portion of the feeding mechanism mounted in the drawer; a second operating member connected to the portion of the printing mechanism mounted in the drawer, said members connected to each other and constructed and arranged to receive an initial and a return movement each machine operation to actuate the feeding and the printing mechanisms; means effective when the drawer is in its innermost position and coacting with the first member to impart initial movement to the members and to the feeding and printing mechanisms, said means coacting with the second member to impart return movement to the members and to the feeding and printing mechanisms; and means to move the first member out of coacting relationship with the imparting means to disable the feeding and printing mechanisms.

MAYO A. GOODBAR.
ALBERT J. GREEN.

REFERENCES CITED

The following references are of record in the file of this patent:

UNITED STATES PATENTS

| Number | Name | Date |
|---|---|---|
| 1,058,645 | Tily | Apr. 8, 1913 |
| 1,258,752 | Deming | Mar. 12, 1918 |
| 1,705,272 | Sundstrand | Mar. 12, 1929 |
| 1,743,277 | Langford | June 14, 1930 |
| 2,230,682 | Fuller | Feb. 4, 1941 |
| 2,240,549 | Carroll | May 6, 1941 |
| 2,342,082 | Klosterman | Feb. 15, 1944 |